US012116839B2

(12) United States Patent
Simms

(10) Patent No.: US 12,116,839 B2
(45) Date of Patent: Oct. 15, 2024

(54) TRANSOM BLIND ACCESSORY FOR VENETIAN BLINDS AND BLINDS FORMED WITH A TRANSOM

(71) Applicant: William Alex Simms, Centerville, OH (US)

(72) Inventor: William Alex Simms, Centerville, OH (US)

( * ) Notice: Subject to any disclaimer, the term of this patent is extended or adjusted under 35 U.S.C. 154(b) by 839 days.

(21) Appl. No.: 17/200,775

(22) Filed: Mar. 13, 2021

(65) Prior Publication Data

US 2021/0270085 A1 Sep. 2, 2021

Related U.S. Application Data

(63) Continuation-in-part of application No. 16/385,028, filed on Apr. 16, 2019, now abandoned.

(51) Int. Cl.
*E06B 9/38* (2006.01)
*E06B 9/303* (2006.01)

(52) U.S. Cl.
CPC ................ *E06B 9/38* (2013.01); *E06B 9/303* (2013.01)

(58) Field of Classification Search
CPC . E06B 9/38; E06B 9/303; E06B 9/323; E06B 9/26; E06B 9/262; A47H 2/00
See application file for complete search history.

(56) References Cited

U.S. PATENT DOCUMENTS 4,222,156 A * 9/1980 Anderle .................. E06B 9/323 24/457
4,384,605 A * 5/1983 Schaeffer .................. E06B 9/38 160/19
4,813,468 A * 3/1989 Fraser ...................... E06B 9/32 160/84.03
5,803,144 A * 9/1998 Ives ........................ A47H 2/00 160/39
6,196,292 B1 * 3/2001 Jackson .................. E06B 9/303 160/113
6,276,425 B1 * 8/2001 Mausar .................. E06B 9/262 160/84.03
6,516,856 B2 * 2/2003 Lai ......................... E06B 9/262 160/167 R
2005/0252618 A1 * 11/2005 Hsu ........................ E06B 9/262 160/84.03
2009/0014133 A1 * 1/2009 Lin ......................... E06B 9/262 160/181
2009/0078378 A1 * 3/2009 Cecchetti ................ E06B 9/386 160/166.1
2009/0101288 A1 * 4/2009 Yu .......................... E06B 9/262 160/84.05
2016/0130867 A1 * 5/2016 Cheng ..................... E06B 9/262 160/181
2018/0080279 A1 * 3/2018 Eubanks, Sr. ............ E06B 9/38

* cited by examiner

*Primary Examiner* — Abe Massad
*Assistant Examiner* — Jeremy C Ramsey
(74) *Attorney, Agent, or Firm* — R. William Graham

(57) ABSTRACT

A transom blind accessory for a window pocket for receiving one or more blind includes a covering member between upper and lower blinds.

7 Claims, 4 Drawing Sheets

TRANSOM BLIND ACCESSORY FOR VENETIAN BLINDS AND BLINDS FORMED WITH A TRANSOM

This application is a continuation-in-part of U.S. Ser. No. 16/385,028 filed Apr. 16, 2019 and claims the benefit thereof.

FIELD OF THE INVENTION

This invention relates generally to a venetian blind. More particularly, but not by way of limitation, the invention relates to a transom blind accessory which is adapted to hold one or more elongated members of a bottom and optionally a top of adjacent venetian blinds which acts to separate two sets of blinds in a way which one set can remain open while the other can be closed creating a selectively amount of light into the room as desired. The invention also relates to a venetian blind formed with a transom.

BACKGROUND OF THE INVENTION

A venetian blind typically has a headrail or channel which is mounted along the upper side of a window casing and has a plurality of horizontal slats which are suspended in a vertically spaced relationship below the headrail by string or tape ladders and there is provided a bottom rail which includes rail caps and bottom rail buttons to terminate and retain the terminal end of the ladders. The headrail contains a mechanism which provides for raising or lowering and tilting of the slats. In some applications, a valence is provided to hide the headrail for aesthetic reasons.

There is a desire to improve existing venetian blinds. The instant invention provides a significant improvement and accessory to venetian blinds.

SUMMARY OF THE INVENTION

Accordingly, an object of the present invention is to improve venetian blinds.

Another object is provide a transom blind accessory for venetian blinds.

Still a further object is to provide a transom blind accessory for receiving at least a bottom rail of an upper mounted venetian blind and optionally a headrail of lower mounted blind to conceal both the bottom rail the headrail and to provide an aesthetically pleasing effect whereby a transom is formed permitting a user to selectively open the upper or lower blind.

A further object of the present invention is to provide a transom blind accessory which is easy to install on existing blinds.

Yet another object of the present invention is to provide a transom blind accessory which is simple and inexpensive to manufacture.

One other object is to provide a unique venetian blind which includes and separate upper and lower selectable openable/closable sections.

Still another object is to provide a transom blind accessory with an aesthetic interchangeable face.

The objects and purposes of the invention, including those set forth above, are met by providing at least one elongate covering member separating an upper blind and a lower blind thereby providing a transom effect between the two blinds. In one embodiment, the covering member can include a vertical portion and a horizontal portion which in one case can be a generally U-shaped cross section for receiving a bottom rail of the blind. In more preferred embodiment, the covering member can include a generally H-shaped cross-section for receiving a bottom rail of the upper blind and a head rail of the lower blind. In yet another embodiment, the covering member can be an integral part of a blind which separates the upper blind and lower blind and houses a mechanism to permit separate operability of opening and closing the upper and lower blinds.

It is contemplated that in the embodiments wherein the covering member is not an integral component, but a separate accessory, that there can be provided with inwardly extending detents on one or more an inner wall surface to aid in retaining the bottom rail or head rail. Further, it is contemplated that one or more wall surface of the covering member can be selectable actuated to a desired width to provide a desired fit about the respective bottom rail or head rail.

Another aspect is that the side wall of transom accessory can be contoured or receives a printed indicia for one's enjoyment or advertising. One embodiment of invention contemplates a separate side channel member which has at least one retention lip to permit the channel to be removable (e.g., slidably) received onto the horizontal face of the blind cover member There can be provided a predetermined amount of spacing in the retention lip to provide for receipt of a decorative panel member or fabric to be received between the channel member and the horizontal face, and in this embodiment, the channel member could be translucent. Optionally, the channel member can be provided with a decorative exterior surface.

Another embodiment contemplates the use of a multi-lip configuration wherein an inwardly extending lip is used to retain the channel member on the cover member and an outwardly extending lip is used to retain the decorative panel member. The channel member need not be translucent in this embodiment.

BRIEF DESCRIPTION OF THE DRAWINGS

Other objects, purposes and advantages of this invention will be apparent to persons acquainted with apparatus of this general type upon reading the following description and inspecting the accompanying drawings, in which.

DETAILED DESCRIPTION OF PREFERRED EMBODIMENTS

Figure 1:
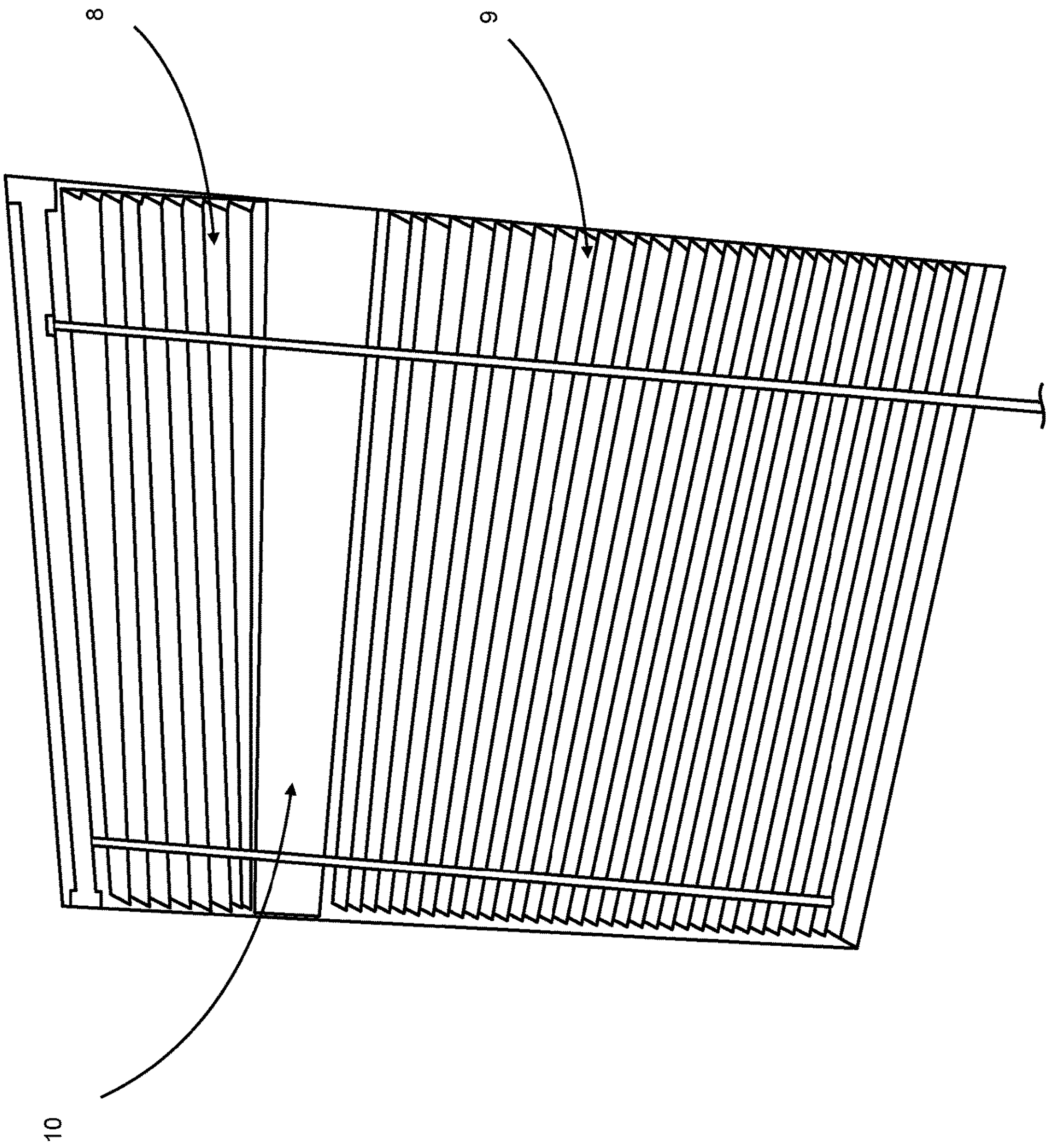
FIG. 1 is a perspective view of one exemplary embodiment of the invention.

Referring now to the drawings, a transom blind accessory or covering member is generally referred to by the numeral 10 (and as seen in the drawings in various embodiments as 60, 600,700 and 800). The transom blind accessory 10 can be configured for use with a conventional venetian blind 8 or 9 as will be apparent hereinafter. Like parts will be reflected with like numerals.

In one embodiment, the venetian blind 8 will include a headrail 12 which is commonly an inverted U-shaped channel, typically made of metal or rigid plastic, having an upper wall 14, and two downward extending side walls 16 and 18. An operating mechanism 20 is operably mounted on the upper wall 14 within the headrail 12 and connected to this is a ladder 22 (string to tape, for example) which suspends a plurality of horizontal blind slats 24 from the headrail 12. A bottom rail 26 serves as the lower slat and includes button holes (not shown) through which pull strings 28 extend and are held in fixed position thereto by buttons (not shown) which insert into the button holes (not shown) on the bottom rail 26 and sandwich an end 30 of the pull string 28. Another end 32 of the pull string extends up through the ladder 22 and operating mechanism 20 and out thereof with sufficient length to enable one to grasp and pull on the same in order to raise and lower the ladder 22. A handle 34 is operably connected to a pivoting member 36 within the operating mechanism 20 wherein the rotation of the handle 34 causes the pivoting member 36 to rotate between two points in a limited manner and with the ladder 22 operably connected to the pivoting member 36 such that the rotation causes the slats 24 to move from an open to closed position. In this regard, the ladder 22 is operably connected to the operating mechanism 20 to enable actuation of the ladder 22 and in turn the slats 24 by pull strings 28 and/or handle 34.

For one embodiment, the blind 9 is similarly formed to that of blind 8 but as will be apparent, the handle 28, ladder 22 length and number of slats 24 can vary. The blinds 8 and 9 are disposed in a window pocket, having side walls 50 of a height H, top wall 52 and bottom wall 54, of a width Wand all of which have a depth D. The blinds 8, 9 are of a width $W1=W-\Delta x$ spanning substantially between the walls (50). The headrail (12) has a height H1, width W1 and a depth $D1=D-\Delta y$, a ladder (22) (which are strings or tape, for example), slats (24) having a height $H2=H1-\Delta a$ and a depth $D2=D1-\Delta z$ and bottom rail (26) having a height $H3=H1-\Delta b$ and a depth $D3=D1-\Delta z'$ and a width approximately W1.

In this illustrated embodiment, a fewer number of slats 24 and shorter ladder 22 and handle 34 length are preferred for upper blind 8 than lower blind 9 which is depicted in a window pocket for receiving blinds 8, 9. The headrail 12 of blind 8 will be mounted in a conventional manner adjacent the top wall 52. Preferably, the headrail 12 of the blind 9 will be mounted more than half way up the side walls 50 in a horizontal manner. The ladder 22 length of blind 8 will preferably be sufficient such that bottom rail 26 will rest adjacent the top of headrail 12 of blind 9 and ladder 22 length of blind 9 will be such that bottom rail 26 will rest adjacent the bottom wall 54.

In another embodiment, at least one elongate covering member 60 is provided to cover the bottom rail 26 of upper blind 8 and be disposed adjacent the head rail 12 of lower blind 9 thereby providing a transom effect between the two blinds 8 and 9. In one embodiment, the covering member 60 can include a generally U-shaped cross section defining an upper channel 61 having a lower wall 62, and two upward extending side walls 64 and 68 which are configured of sufficient length and width for receiving the bottom rail 26 of the blind 8 and optionally one or more slats 24. The lower wall 62 is preferably configured, flat for example, to lay on top of headrail 12 of blind 9 so that substantially no light passes therebetween. The generally U-shaped cross section is formed with the lower wall (62) of a depth $D3+\Delta m$, and two upward extending side walls (64, 68) and having a height of at least $H3+\Delta n$ which is provides for the covering member 60 covering at least the bottom rail 26 and preferable one or more slat 24.

In another embodiment, the covering member 600 can include a generally H-shaped cross-section defining upper channel 670 and lower channel 672 having a cross-section wall 662, and two extending side walls 664 and 668 which are configured of sufficient length and width for receiving the bottom rail 26 of the upper blind 8 and optionally one or more slats 24 in an upper channel 670 of the covering member 600 and lower channel 672 for receiving the headrail 12 of the lower blind 9.

Figures 2, 3, 4, 5, 6:
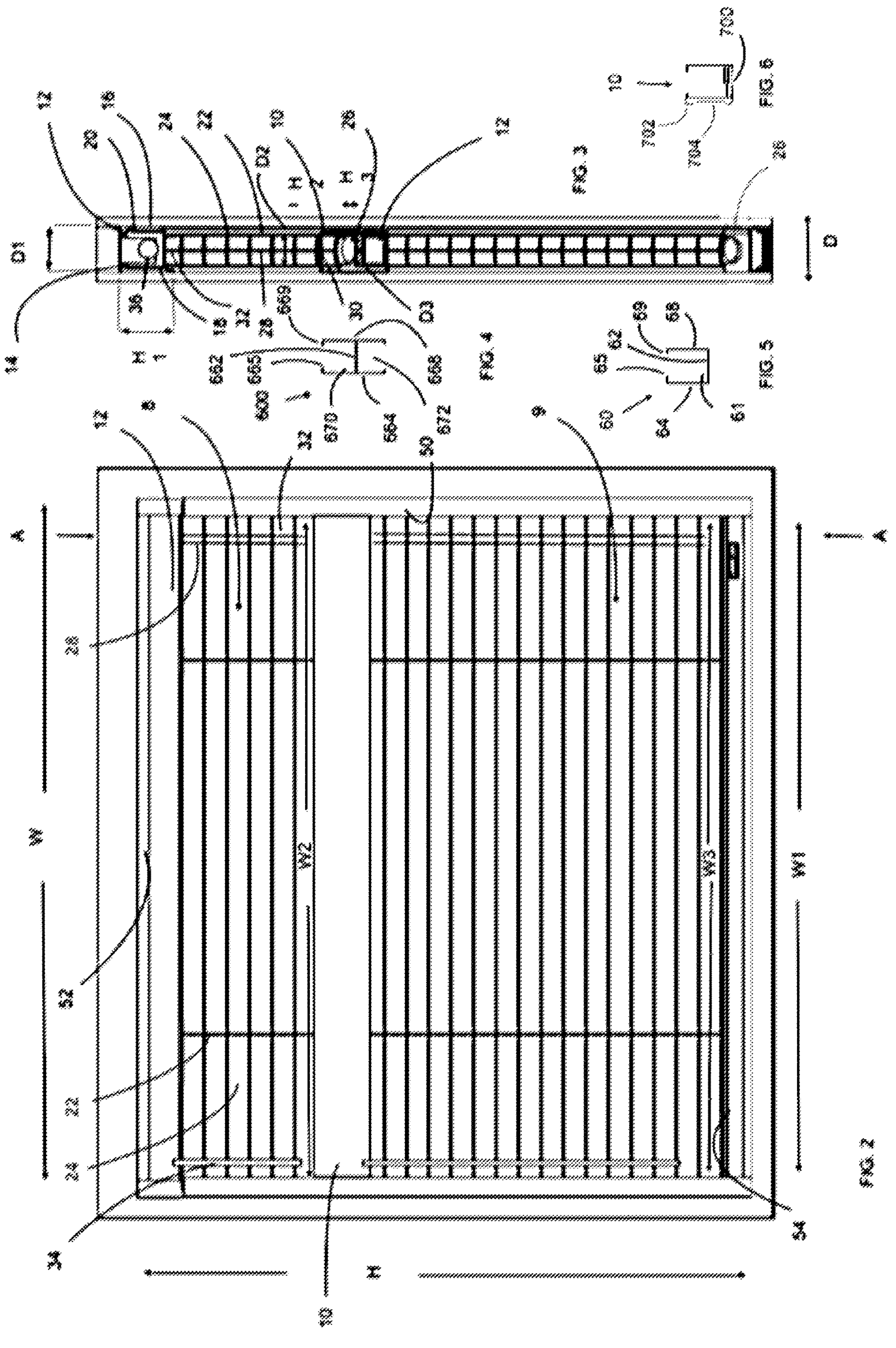
FIG. 2 a plan view of an embodiment of the invention.
FIG. 3 is a cross section view through line A-A in FIG. 2.
FIG. 4 is an end view of a transom accessory of the invention.
FIG. 5 is an end view of another embodiment of the transom accessory of the invention.
FIG. 6 is another embodiment of the transom accessory of the invention.
Figure 7:
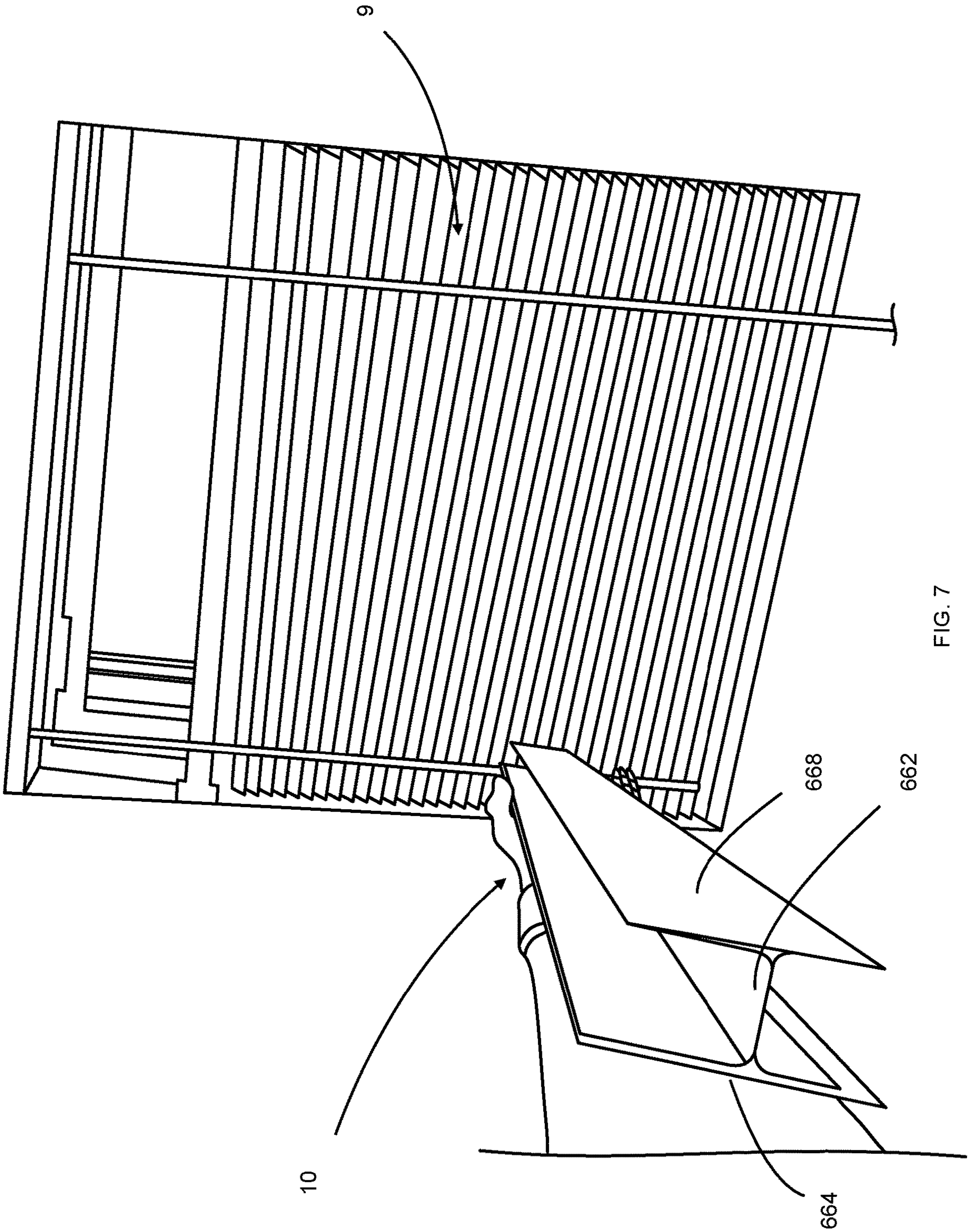
FIG. 7 is a perspective view of a part of the invention.

It is contemplated that the side walls 64, 68, 664 and 668 can include inwardly formed protrusions 65, 69, 665 and 669 serving as detents to aid retention of the respective part received. It is also contemplated that the side walls 64, 68, 664 and 668 can be integrally connected to their respective lower wall 62 and cross-section wall 662, respectively, or connected by other means, such as a ratchet type snap fit as seen in covering member 700, to provide for adjustability in width to accommodate various width slats and rails (see FIG. 6).

In yet another embodiment, the covering member 10 can be an integral part of a transom blind which separates an upper blind portion 8 and lower blind portion 9. In this embodiment for example, the cross section wall 662 can serve as both a bottom rail and headrail for the respective upper blind 8 and lower blind 9. In this embodiment, there there can be provided an L bracket mount or the like to secure the covering member 10 to the side walls 50.

Another aspect is that the side wall of transom accessory 10, as seen 700, for example, can be contoured or configured with a retainer element 702 which receives a printed member 704 for one's enjoyment or advertising. For example, the side walls 64, 68, 664 and 668 can be provided with a curved surface or flat and can include a printed indicia of advertising or memorabilia, such as favorite sports team. It is contemplated that the side walls 64, 68, 664 and 668 can be provided with retainer clip permitting interchangeable a side panel covering to be inserted thereto, thus enabling a color selection, or displaying an image as desired, such as a sports team logo or other advertisement.

Figures 8, 9, 10:
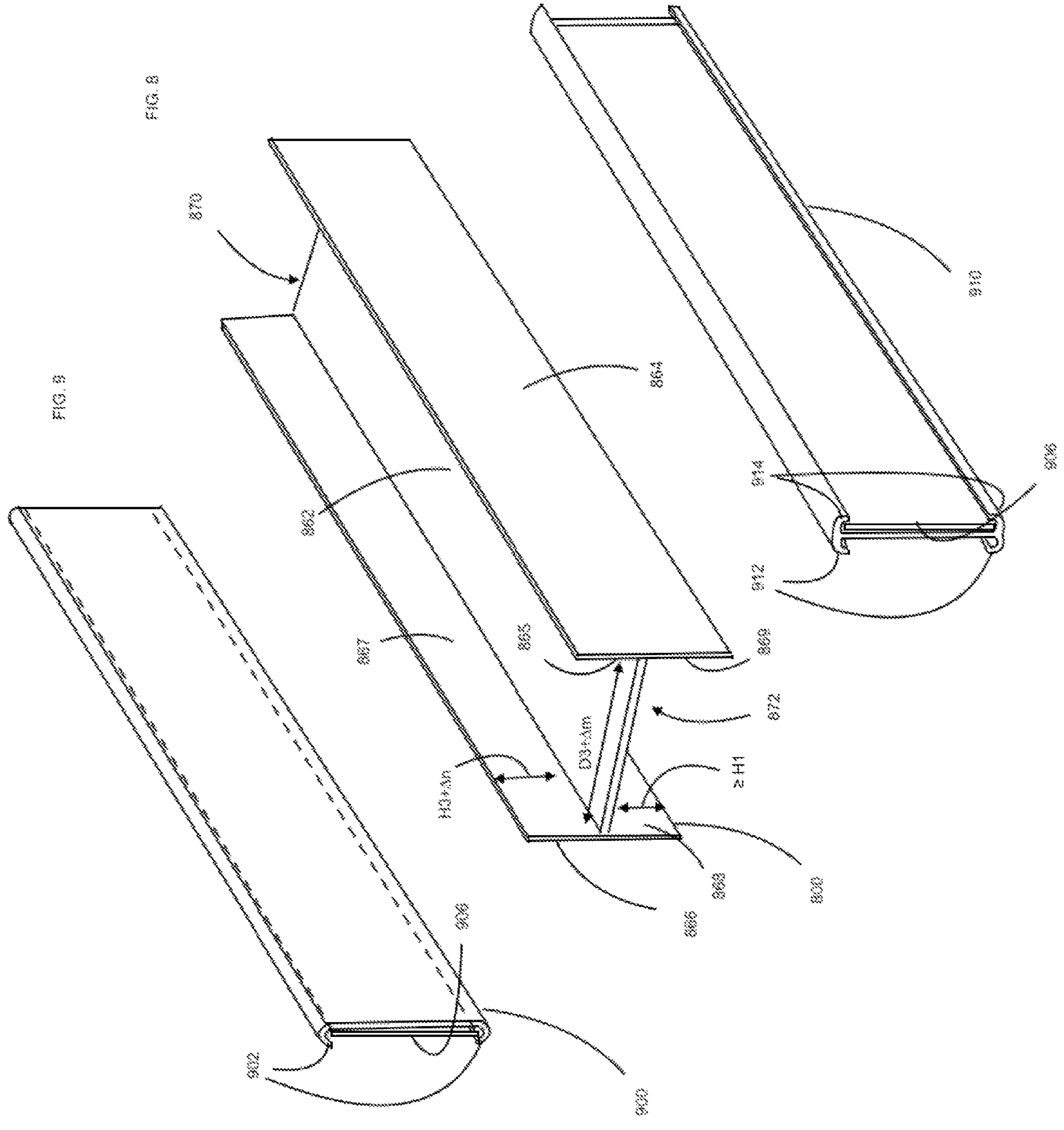
FIG. 8 is a perspective view of an embodiment of the instant invention.
FIG. 9 is a perspective view of a channel member for removably receipt on the embodiment of FIG. 8.
FIG. 10 is a perspective view of another channel member for removably receipt on the embodiment of FIG. 8

In the embodiment of FIG. 8, there is provided a transom accessory 800, a cover member which is generally H-shaped cross-section defining upper channel 870 and lower channel 872 having a cross-section wall 862, and two extending side walls 864 and 866 which are collectively configured of sufficient length and width for receiving the bottom rail 26 of the upper blind 8 and optionally one or more slats 24 in the upper channel 870 of the covering member 800 and lower channel 872 for receiving the headrail 12 of the lower blind 9. The cover member 800 can similarly have the cross-section wall 862 a depth $D3+\Delta m$, and upper portions (865, 867) of extending side walls (864, 866) and having a height of at least $H3+\Delta n$ which is provides for covering at least the bottom rail 26 and preferable one or more slat 24. Lower portions 868, 869 of extending side walls (864, 866) have a height of at least H1 which is provides for covering at least the head rail 12. It is contemplated H1 and $H3+\Delta n$ can be the same or different values so long as they accomplish the intended results in accordance to achieve the desired aesthetically pleasing visual effect.

Another aspect of the invention as seen in FIG. 9 there is provided a channel member 900 which has at least one or more retention lip 902 to permit the channel member 900 to be removable (e.g., slidably) received onto the horizontal face of side 864 of the blind cover member 800. There can be provided a predetermined amount of spacing in the retention lip 902 to provide for receipt of a decorative panel member (or fabric) 906 to be received between the channel member 900 and the side 864. In this embodiment, the channel member 900 could be translucent. Optionally, the channel member 900 can be provided with a decorative exterior surface.

Another aspect of the invention as seen in FIG. 10 there is another embodiment which contemplates the use of a multi-lip configuration as in channel member 910 wherein an inwardly extending lips 912 are used to retain the channel member 910 on the cover member 800 and outwardly extending lips 914 are used to retain decorative panel member 906. The inwardly extending lips 912 can be configured with enough space to snugly receive the thickness of the side 864 whereas the outwardly extending lips 914 can provide enough spacing to receive (e.g., up to 100 mil) thick material which allows for retention of a variety of decorative panel material. The channel member 910 need not be translucent in this embodiment. By so providing, there can be a multitude of interchangeable decorative panels which can include photographic displays, special occasion media, fabric or other aesthetically pleasing decor.

Another aspect of the invention is providing a method for displaying decorative items. The method includes connecting a decorative item as part of a panel to a channel member. Further, the method includes removably placing the channel member onto the cover member which step can be done prior to applying the deceptive item or with the decorative item thereon.

By so providing, the invention transforms conventional venetian blind technology to enable one to have a transom effect within a single window which is aesthetically and functionally unique. It is contemplated that other modifications, derivations and variation of the invention will be apparent to those skilled in the art and that these should be afforded within the scope of the claims appended hereto.

What is claimed is:

1. A transom blind for a window pocket of a first height and a first width, the window pocket having side walls, a top wall and a bottom wall which receives an upper blind and a lower blind, each blind of the upper and lower blind having a second width less than said first width spanning substantially between the side walls, each blind of the upper and lower blind having a headrail, a ladder, slats and a bottom rail and wherein each headrail has a second height, a third width and a first depth, each slat has a third height, fourth width and a second depth and each bottom rail has a fourth height, fifth width and a third depth, wherein said transom blind includes:

a covering member having a generally H-shaped cross-section cross section defining an upper channel and a lower channel having a horizontal cross-section wall, and two laterally vertical extending side walls interconnected by said horizontal cross-section wall which are configured of sufficient length and width and receive the bottom rail of the upper blind in said upper channel and receive the headrail of the lower blind in said lower channel; and a channel member which has opposing upper and lower inwardly and outwardly formed retention lips, wherein the upper and lower inwardly formed retention lips engage one of said side walls of said covering member, and the outwardly formed retention lips are configured for retaining an interchangeable panel, the inwardly formed retention lips permitting the channel member to be removably received onto a horizontal face of said side wall.

2. The transom blind of claim 1, wherein said upper channel cross section wall is of a fourth depth greater than the third depth which is provides for covering at least the bottom rail of the upper blind.

3. The transom blind of claim 1, wherein said lower channel is configured in a complementary manner to rest on the head rail of the lower blind.

4. The transom blind of claim 3, wherein said side wall is of a height to cover said headrail of the lower blind to substantially prevent light from passing by and between said headrail and said slats.

5. The transom blind of claim 1, wherein said side walls have a height of at least said second height and said third height combined.

6. The transom blind of claim 1, wherein said cross-section wall is configured to rest on the head rail of the lower blind.

7. The transom blind accessory of claim 1, wherein said channel member is one of opaque or translucent.

* * * * *